US011872679B1

(12) United States Patent
Cheng

(10) Patent No.: US 11,872,679 B1
(45) Date of Patent: Jan. 16, 2024

(54) PNEUMATIC NAIL GUN

(71) Applicant: ANN-CHAIN ENTERPRISE CO., LTD., Changhua (TW)

(72) Inventor: Hui-Cheng Cheng, Changhua (TW)

(73) Assignee: ANN-CHAIN ENTERPRISE CO., LTD., Changhua (TW)

( * ) Notice: Subject to any disclaimer, the term of this patent is extended or adjusted under 35 U.S.C. 154(b) by 0 days.

(21) Appl. No.: 17/864,719

(22) Filed: Jul. 14, 2022

(51) Int. Cl.
*B25C 5/16* (2006.01)
*B25C 1/04* (2006.01)
*B25C 1/00* (2006.01)

(52) U.S. Cl.
CPC ............ *B25C 5/1651* (2013.01); *B25C 1/005* (2013.01); *B25C 1/047* (2013.01); *B25C 5/1665* (2013.01)

(58) Field of Classification Search
CPC ....... B25C 5/1651; B25C 1/005; B25C 1/047; B25C 5/1665
See application file for complete search history.

(56) References Cited

U.S. PATENT DOCUMENTS 2,174,152 A * 9/1939 Curtiss .................. B25C 5/0285 72/409.03
3,023,417 A * 3/1962 Michel ................. A01K 15/003 227/114
5,035,040 A * 7/1991 Kerrigan ................... F16B 2/26 72/409.03
8,020,357 B2 * 9/2011 Haschke ................. B65B 51/04 53/138.4
10,239,196 B2 * 3/2019 Cheng ..................... B25B 21/00
2010/0078461 A1 * 4/2010 Shen ....................... B25C 5/161 227/129

FOREIGN PATENT DOCUMENTS

CN 210650540 U 6/2020
TW I603818 11/2017

* cited by examiner

*Primary Examiner* — Thomas M Wittenschlaeger
*Assistant Examiner* — Katie L Gerth
(74) *Attorney, Agent, or Firm* — MUNCY, GEISSLER, OLDS & LOWE, P.C.

(57) ABSTRACT

The invention provides a pneumatic nail gun, comprising a gun body, a nail box, a fork and a nail forming device. The gun body comprises a sliding groove, a nail outlet adjacent to the sliding groove and a push block. The nail box and the fork are fixed on the gun body. The nail box is configured to place a plurality of strip nails to be sequentially exposed from the nail outlet. The formed fork comprises two forming surfaces with unequal heights, and the two forming surfaces are adjacent to the nail outlet. The nail forming device comprises two jaw arms, two control arms and a push seat, and the push block drives the two control arms to drive the two jaw arms to rotate and close the two forming jaws, and to drive the push seat to slide on the sliding groove.

4 Claims, 4 Drawing Sheets

PNEUMATIC NAIL GUN

FIELD OF THE INVENTION

The present invention relates to a nail gun, in particular to a nail discharging and forming structure for the nail gun.

BACKGROUND OF THE INVENTION

The nail gun is a tool which would be used for buildings and decorations and connects different work pieces together by firing spikes. A conventional nail gun, as disclosed in Taiwan Patent No. 1603818, entitled with "MAGAZINE ASSEMBLY AND A STAPLER INCLUDING THE SAME", discloses a nail box component and a nail gun comprising the same.

However, for construction materials, such as a spring bed and a light steel frame, in a wire type, a C-type nail gun can be used to complete binding operations of different wires. A conventional C-type nail gun, as disclosed in China Patent No. CN210650540U, entitled with "Nail Clamping Drive Device of Electric C-type Nail Gun", buckled rings with aligned ends may be formed and may be used for binding the construction materials such as the spring bed and the light steel frame.

However, when withstanding a certain amount of weight, the buckled rings with the aligned ends, formed by the conventional C-type nail gun, are prone to slightly deforming to cause a problem of no closure anymore and are prone to causing the risk that the bound construction materials fall off; and therefore, the conventional C-type nail gun is not suitable for application places requiring weight bearing.

However, in the prior art, if the buckled rings with crossing ends require to be formed, the nail box which continuously discharges nails cannot normally run as the buckled rings may make displacements in a vertical direction when being formed. This is to say, nail inlet can be conducted in a mode of inputting nails one by one only; so that the operation efficiency is low, and the demands in use cannot be met.

SUMMARY OF THE INVENTION

A main objective of the present invention is to provide a pneumatic nail gun capable of outputting buckled ring with crossing end and continuously discharging nails.

To achieve the above objective, the present invention provides a pneumatic nail gun configured to form a buckled ring with a crossing end by a plurality of strip nails each, comprising a gun body, a nail box, a formed fork and a nail forming device. The gun body comprises a sliding groove, a nail outlet adjacent to the sliding groove, and a push block with an initial position and an actuation position.

The nail box is fixed on the gun body and configured to place the plurality of strip nails to be sequentially exposed from the nail outlet, wherein a bottom of one of the plurality of strip nails exposed from the nail outlet is at a height same as a top of the sliding groove.

The fork is fixed on the gun body and comprises two forming surfaces with unequal heights, wherein the two forming surfaces are adjacent to one side of the nail outlet opposite to the sliding groove, and a height difference between the two forming surfaces is larger than a thickness of each of the plurality of strip nails.

The nail forming device comprises two jaw arms, two control arms, and a push seat, wherein each of the two jaw arms is provided with a through hole, and two through holes of the two jaw arms are overlapped; one end of each of the two jaw arms forms a jaw, an other end of each of the two jaw arms is pivoted to an end of one of the two control arms through a first pivot, and an other end of one of the two control arms is overlapped with an other end of other one of the two control arms, the other ends of the two control arms are pivoted to the push block through a second pivot; and wherein the push seat comprises a rotating shaft and is slidably arranged on the sliding groove, and the rotating shaft penetrates through the two through holes overlapped.

When the push block is changed to the actuation position from the initial position, the two control arms are driven to drive the two jaw arms to rotate and close the two forming jaws, and to drive the push seat to slide on the sliding groove at the same time, and the push seat pushes one of the plurality of strip nails exposed from the nail outlet to the fork, and an end of the strip nail is staggered by closing actions of the two forming jaws together with the two forming surfaces with unequal heights, and the buckled ring with crossing end is formed.

Accordingly, in the present invention, when the plurality of strip nails are formed into the buckled rings with the crossing ends, respectively, the plurality of strip nails exposed from the nail outlet are pushed by the push seat to the fork; and therefore, the displacements of the buckled rings in the vertical direction when the buckled ring is formed cannot affect normal operation of the nail box. Also, the ends of the plurality of strip nails are staggered through the closing actions of the two forming jaws and the two forming surfaces with unequal heights, and thus the buckled ring with the crossing end is formed, and the use demand on continuous nail outlet is met.

DETAILED DESCRIPTION OF THE PREFERRED EMBODIMENTS

Figure 1:
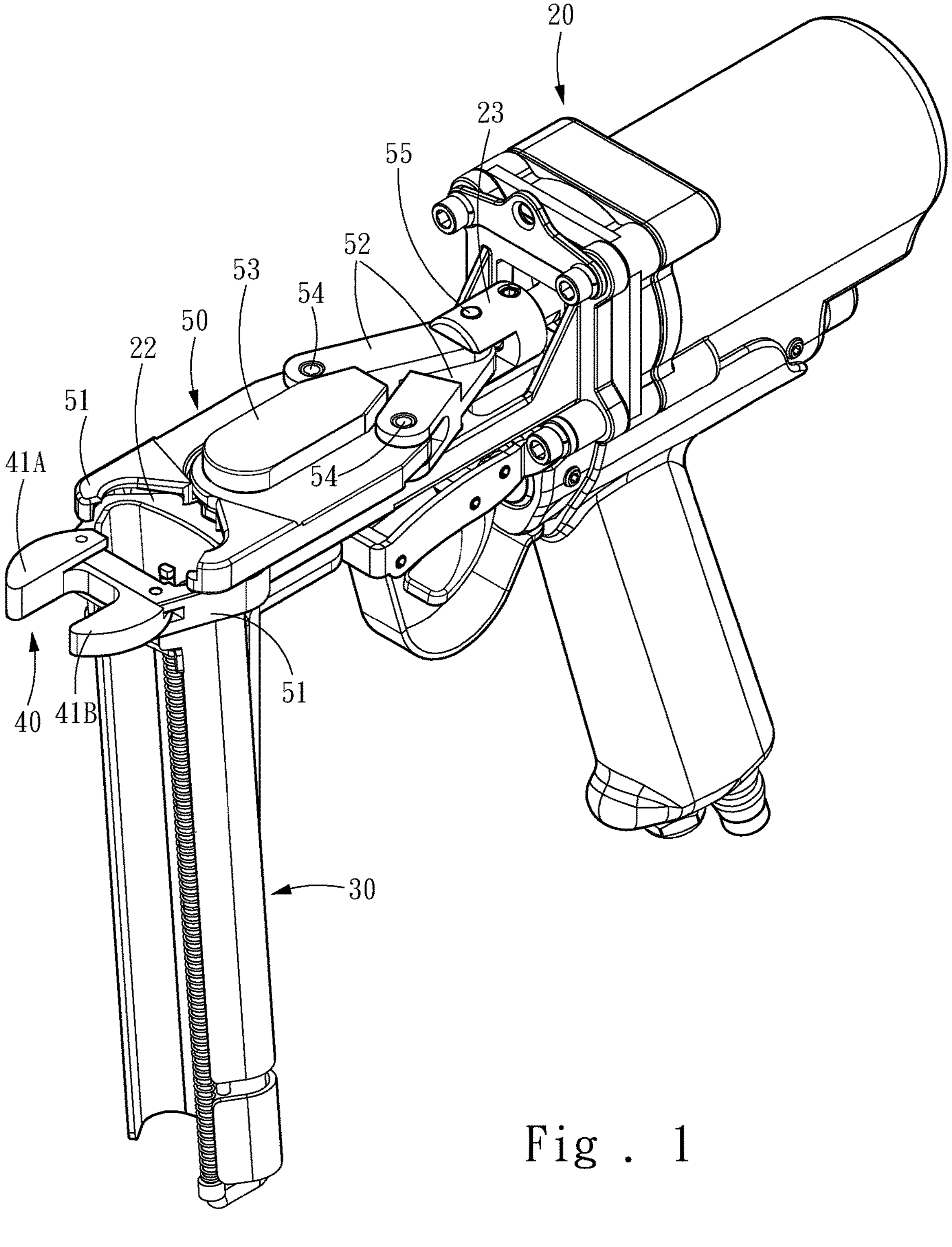
FIG. 1 is a schematic diagram of a three-dimensional structure of the present invention.
Figure 2:
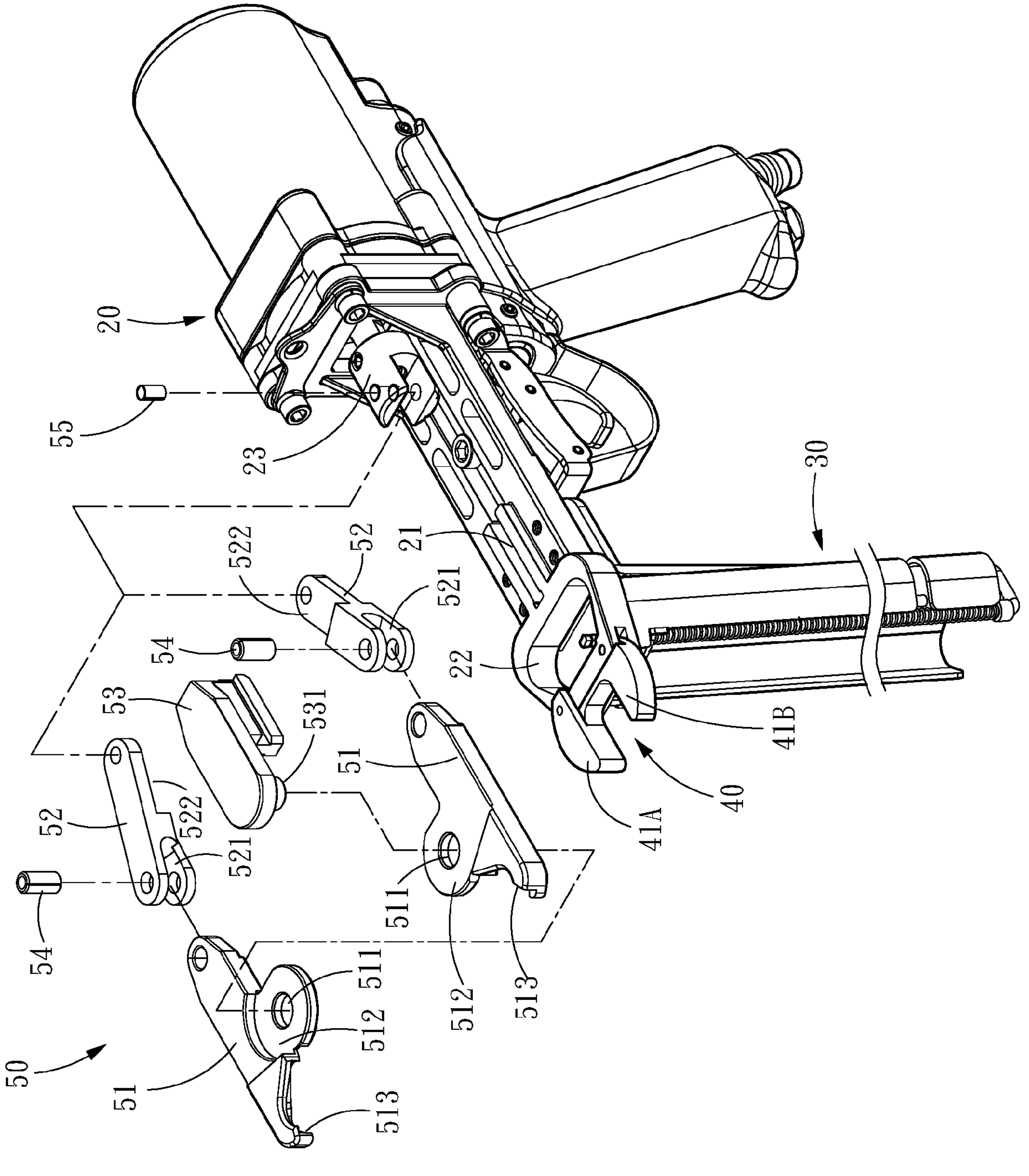
FIG. 2 is an exploded view of a partial structure of the present invention.
Figure 3:
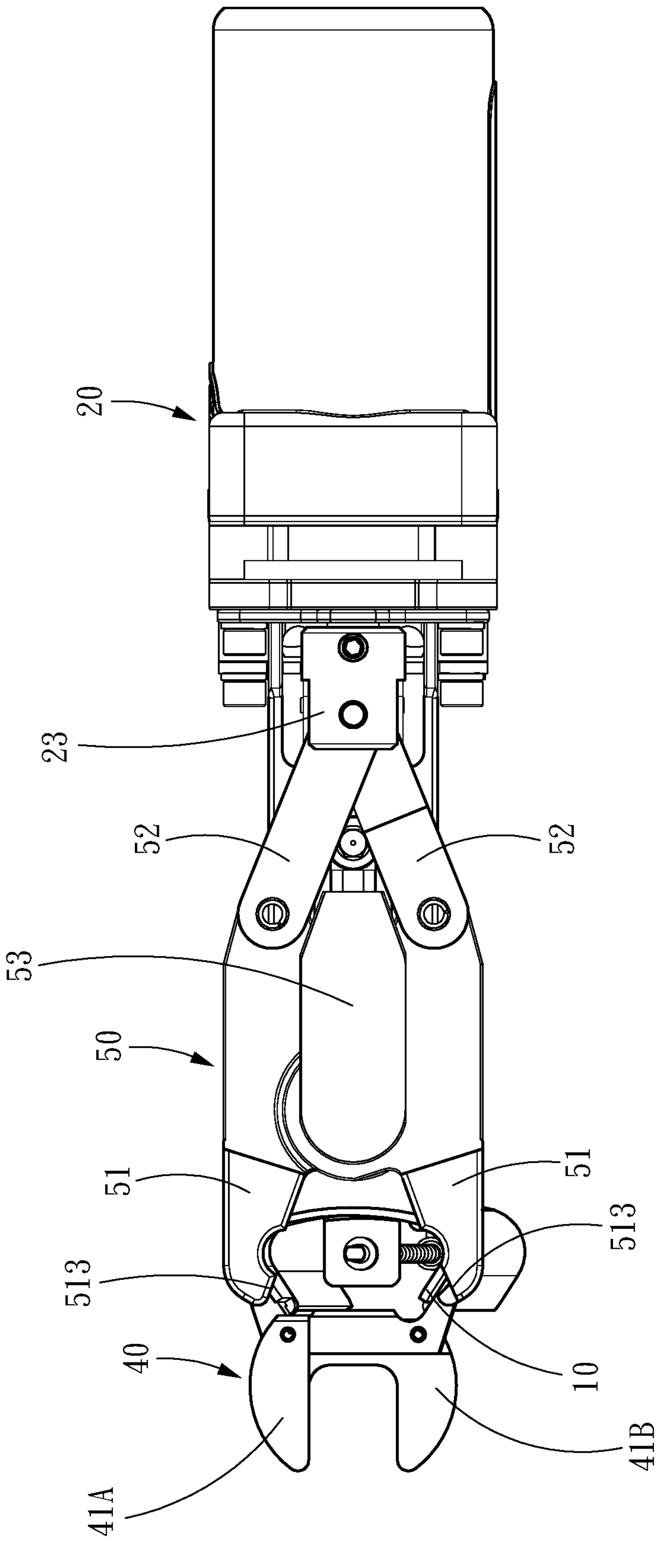
FIG. 3 is a first schematic diagram of use of the present invention.
Figure 4:
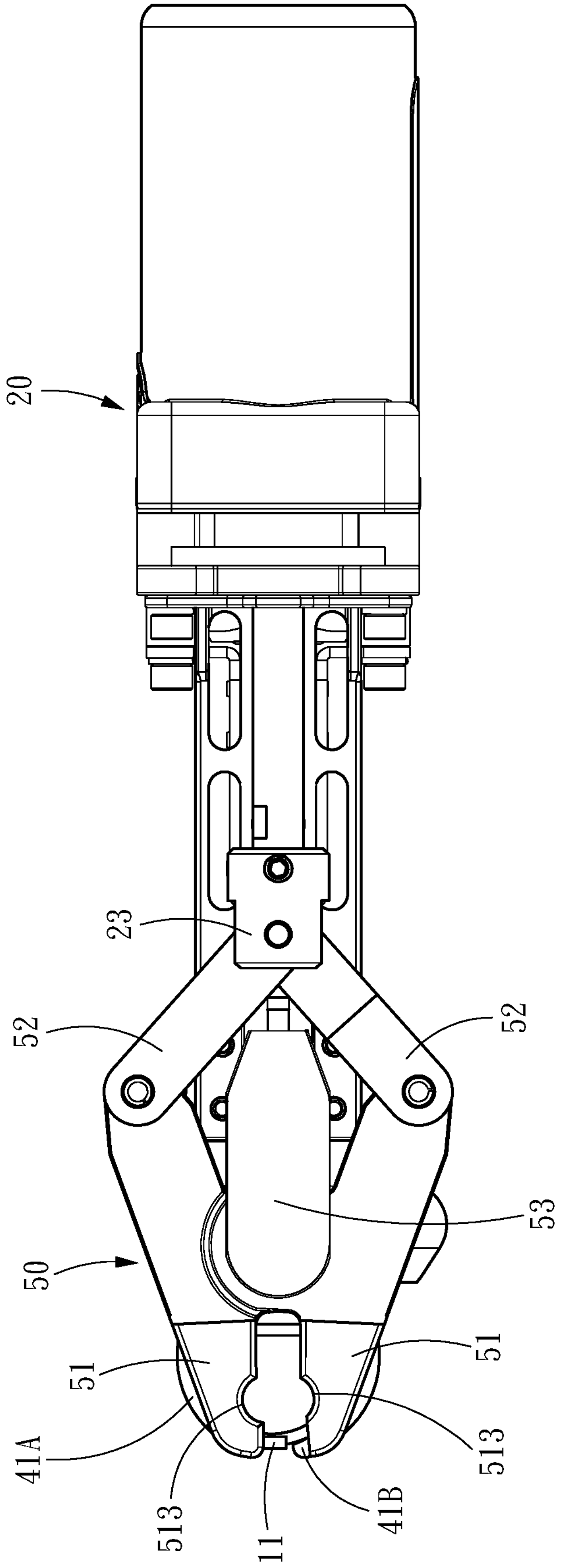
FIG. 4 is a second schematic diagram of use of the present invention

Now, the detailed description and the technical content of the present invention are described in cooperation of drawings as follows:

Referring to FIG. 1, FIG. 2, FIG. 3 and FIG. 4, the present invention provides a pneumatic nail gun configured to form a buckled ring 11 with a crossing end by a plurality of strip nails 10 each. The pneumatic nail gun comprises a gun body 20, a nail box 30, a fork 40 and a nail forming device 50, wherein the gun body 20 comprises a sliding groove 21, a nail outlet 22 and a push block 23. The nail outlet 22 is adjacent to the sliding groove 21. The push block 23 is controlled to be located at an initial position (as shown in FIG. 3) and an actuation position (as shown in FIG. 4).

The nail box 30 is fixed on the gun body 20 and configured to place the plurality of strip nails 10 to be sequentially exposed from the nail outlet 22, wherein the bottom of one of the plurality of strip nails 10 exposed from the nail outlet 22 is at a height same as a top of the sliding groove 21. The fork 40 is fixed on the gun body 20 and comprises two forming surfaces 41A, 41B with unequal heights, and the two forming surfaces 41A, 41B are adjacent to one side of the nail outlet 22 opposite to the sliding groove 21. A height difference between the two forming surfaces 41A, 41B is larger than a thickness of each of the plurality of strip nails 10.

The nail forming device 50 comprises two jaw arms 51, two control arms 52 and a push seat 53. Each of the two jaw arms 51 is provided with a through hole 511, and two through holes 511 of the two jaw arms 51 are overlapped. In an embodiment, each of the two jaw arms 51 is provided with an overlapping region 512 which is formed with the through hole 511, and two overlapping regions 512 of the two jaw arms 51 correspond with each other. One end of each of the two jaw arms 51 forms a jaw 513, and the other end of each of the two jaw arms 51 is pivoted to one end of each of two control arms 52 through a first pivot 54. In an embodiment, each of the two control arms 52 is provided with a first portion 521 for each of the two jaw arms 51 penetrating, and the first portion 521 is provided for disposal of the first pivot 54. The other ends of two control arms 52 are overlapped and pivoted to the push block 23 through a second pivot 55. In an embodiment, the other end of each of the two control arms 52 comprises a second portion 522, and two second portions 522 of the two control arms 52 are overlapped for disposal of the second pivot 55. The push seat 53 comprises a rotating shaft 531 and is slidably arranged on the sliding groove 21, and the rotating shaft 531 penetrates through the two through holes 511 overlapped.

Further referring to FIG. 2, FIG. 3, and FIG. 4, when the push block 23 is changed to the actuation position (as shown in FIG. 4) from the initial position (as shown in FIG. 3), the two control arms 52 are driven to drive the two jaw arms 51 to rotate and close the two forming jaws 513, and to drive the pushing seat 53 to slide on the sliding groove 21 at the same time, so that the push seat 53 pushes one of the plurality of strip nails 10 exposed from the nail outlet 22 to the fork 40, and the end of the strip nail 10 is staggered (as shown in FIG. 4) by the closing actions of the two forming jaws 513 together with the two forming surfaces 41A, 41B with unequal heights, and thus the buckled ring 11 with the crossing end is formed.

To sum up, compared with the conventional nail gun, the present invention at least has the characteristics that:

1. The invention enables the ends of the plurality of strip nails to be staggered through the closing actions of the two forming jaws and the two forming surfaces with unequal heights, and thus the buckled ring with the crossing end is formed.
2. While forming the strip nail into the buckled ring with the crossing end, one of the plurality of strip nails exposed from the nail outlet is pushed by the push seat to the fork; and therefore, displacements of the buckled ring in a vertical direction when the buckled ring is formed cannot affect operation of the nail box, and the use demand on continuous nail outlet is met.

What is claimed is:

1. A pneumatic nail gun, configured to form a buckled ring with a crossing end by a plurality of strip nails each, comprising:

a gun body, comprising a sliding groove, a nail outlet adjacent to the sliding groove, and a push block with an initial position and an actuation position;

a nail box, fixed on the gun body and configured to place the plurality of strip nails to be sequentially exposed from the nail outlet, wherein a bottom of one of the plurality of strip nails exposed from the nail outlet is at a height same as a top of the sliding groove;

a fork, fixed on the gun body and comprising two forming surfaces with unequal heights, wherein the two forming surfaces are adjacent to one side of the nail outlet opposite to the sliding groove, and a height difference between the two forming surfaces is larger than a thickness of each of the plurality of strip nails; and a nail forming device, comprising two jaw arms, two control arms, and a push seat, wherein each of the two jaw arms is provided with a through hole, and two through holes of the two jaw arms are overlapped; one end of each of the two jaw arms forms a jaw, an other end of each of the two jaw arms is pivoted to an end of one of the two control arms through a first pivot, and an other end of one of the two control arms is overlapped with an other end of other one of the two control arms, the other ends of the two control arms are pivoted to the push block through a second pivot; and wherein the push seat comprises a shaft and is slidably arranged on the sliding groove, and the shaft penetrates through the two through holes overlapped;

wherein when the push block is changed to the actuation position from the initial position, the two control arms are driven to drive the two jaw arms to rotate and close the two forming jaws, and to drive the push seat to slide on the sliding groove at the same time, and the push seat pushes one of the plurality of strip nails exposed from the nail outlet to the fork, and an end of the strip nail is staggered by closing actions of the two forming jaws together with the two forming surfaces with unequal heights, and the buckled ring with crossing end is formed.

2. The pneumatic nail gun according to claim 1, wherein each of the two jaw arms is provided with an overlapping region formed with the through hole, and two overlapping regions of the two jaw arms correspond with each other.

3. The pneumatic nail gun according to claim 1, wherein each of the two control arms is provided with a first portion for each of the two jaw arms penetrating, and the first portion is provided for disposal of the first pivot.

4. The pneumatic nail gun according to claim 1, wherein the other end of each of the two control arms is provided with a second portion, and two second portions of the two control arms are overlapped for disposal of the second pivot.

* * * * *